United States Patent
Totale et al.

(10) Patent No.: US 11,003,424 B2
(45) Date of Patent: *May 11, 2021

(54) METHOD AND SYSTEM FOR IMPLEMENTING CUSTOM UI ACTIONS IN A WEB APPLICATION USING HIDDEN CONTAINERS

(71) Applicant: OPEN TEXT CORPORATION, Waterloo (CA)

(72) Inventors: Sachin Gopaldas Totale, Pleasanton, CA (US); Swati Bhatia, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,362

(22) Filed: Jul. 8, 2019

(65) Prior Publication Data

US 2019/0332363 A1 Oct. 31, 2019

Related U.S. Application Data

(63) Continuation of application No. 16/019,215, filed on Jun. 26, 2018, now Pat. No. 10,360,001, which is a (Continued)

(51) Int. Cl.
*G06F 8/38* (2018.01)
*G06F 8/60* (2018.01)
(Continued)

(52) U.S. Cl.
CPC ............. *G06F 8/38* (2013.01); *G06F 8/60* (2013.01); *G06F 16/958* (2019.01); *G06F 16/9535* (2019.01)

(58) Field of Classification Search
CPC . G06F 8/38; G06F 16/958; G06F 8/60; G06F 16/9535
(Continued)

(56) References Cited

U.S. PATENT DOCUMENTS

| 8,392,877 | B1 * | 3/2013 | Chiluvuri | G06F 8/36 717/106 |
| 10,031,729 | B1 * | 7/2018 | Totale | G06F 8/60 |

(Continued)

OTHER PUBLICATIONS

Office Action issued for U.S. Appl. No. 14/586,172, dated Aug. 11, 2016, 28 pages.
(Continued)

*Primary Examiner* — Lewis A Bullock, Jr.
*Assistant Examiner* — Theodore E Hebert
(74) *Attorney, Agent, or Firm* — Sprinkle IP Law Group

(57) ABSTRACT

In general, the disclosed technology relates to a method for generating a web application. The method includes selecting a webpage in the web application and implementing a custom user interface (UI) action on the webpage. Implementing the custom UI action on the webpage may include creating a hidden component on the webpage, associating a custom UI action with the hidden component, specifying at least one input for the hidden component based on the custom UI action, specifying at least one target output for the hidden component based on the custom UI action, and associating the hidden component with a custom UI action trigger event. The method further includes deploying the web application after implementing the custom UI action on the webpage.

18 Claims, 11 Drawing Sheets

Related U.S. Application Data continuation of application No. 14/586,172, filed on Dec. 30, 2014, now Pat. No. 10,031,729.

(51) Int. Cl.
*G06F 16/958* (2019.01)
*G06F 16/9535* (2019.01)

(58) Field of Classification Search
USPC .......................................................... 717/106
See application file for complete search history.

(56) References Cited

U.S. PATENT DOCUMENTS

| | | | |
|---|---|---|---|
| 10,360,001 B2* | 7/2019 | Totale ................... | G06F 16/958 |
| 2004/0261032 A1* | 12/2004 | Olander ................ | G06F 3/0482 |
| | | | 715/747 |
| 2006/0101442 A1* | 5/2006 | Baumgart ................ | G06F 8/38 |
| | | | 717/162 |
| 2006/0224948 A1* | 10/2006 | Desmond .............. | G06F 40/174 |
| | | | 715/207 |
| 2008/0155457 A1* | 6/2008 | Ittel ........................ | G06F 9/451 |
| | | | 715/781 |
| 2008/0184199 A1* | 7/2008 | Fried ...................... | G06F 9/451 |
| | | | 717/115 |
| 2011/0307798 A1* | 12/2011 | Lezama Guadarrama ................. | |
| | | | G06F 9/4451 |
| | | | 715/744 |
| 2012/0060141 A1* | 3/2012 | Demant ................... | G06F 8/10 |
| | | | 717/101 |
| 2012/0130843 A1* | 5/2012 | Himmerick ............ | G06Q 30/08 |
| | | | 705/26.3 |
| 2012/0324377 A1* | 12/2012 | Allington .................. | G06F 8/38 |
| | | | 715/763 |
| 2013/0275957 A1* | 10/2013 | Villar ..................... | G06F 9/452 |
| | | | 717/173 |
| 2014/0115466 A1* | 4/2014 | Barak ..................... | G06F 9/451 |
| | | | 715/716 |
| 2016/0026373 A1* | 1/2016 | Srivastava ............. | G06Q 10/06 |
| | | | 715/765 |
| 2018/0349111 A1 | 12/2018 | Totale et al. | |
| 2019/0332363 A1* | 10/2019 | Totale ...................... | G06F 8/38 |

OTHER PUBLICATIONS

EMC Corporation, EMC Documentum Web Development Kit, Version 6.5, Development Guide, Jul. 2008, pp. 1-504, P/N 300-007-231 A01, EMC Corporation, Hopkinton, MA, USA.

EMC Corporation, EMC Documentum D2 4.1 Architecture: A Primer, Mar. 2013, pp. 1-25, EMC Corporation.

Office Action issued for U.S. Appl. No. 14/586,172, dated Feb. 27, 2017, 32 pages.

Office Action issued for U.S. Appl. No. 14/586,172, dated Sep. 6, 2017, 35 pages.

Notice of Allowance issued for U.S. Appl. No. 16/019,215, dated Mar. 12, 2019, 16 pages.

* cited by examiner

METHOD AND SYSTEM FOR IMPLEMENTING CUSTOM UI ACTIONS IN A WEB APPLICATION USING HIDDEN CONTAINERS

CROSS-REFERENCE TO RELATED APPLICATION(S)

This application is a continuation of, and claims a benefit of priority under 35 U.S.C. 120 of the filing date of U.S. patent application Ser. No. 16/019,215, filed Jun. 26, 2018, entitled "METHOD AND SYSTEM FOR IMPLEMENTING CUSTOM UI ACTIONS IN A WEB APPLICATION USING HIDDEN CONTAINERS," now U.S. Pat. No. 10,360,001, which is a continuation of, and claims a benefit of priority under 35 U.S.C. 120 of the filing date of U.S. patent application Ser. No. 14/586,172, filed Dec. 30, 2014, entitled "METHOD AND SYSTEM FOR IMPLEMENTING CUSTOM UI ACTIONS IN A WEB APPLICATION USING HIDDEN CONTAINERS" now U.S. Pat. No. 10,031,729, issued on Jul. 24, 2018, the entire contents of which are hereby expressly incorporated by reference for all purposes.

BACKGROUND

A network is a set of interconnected computing devices that may communicate with each other. Web applications are applications that are developed for the network that includes a series of web pages. Each web page may include a button or other navigation control that links to another web page in the series of web pages.

DETAILED DESCRIPTION

Specific embodiments of the disclosed technology will now be described in detail with reference to the accompanying figures. In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

In the following description of FIGS. 1-9, any component described with regard to a figure, in various embodiments of the disclosed technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosed technology, any description of the components of a figure is to be interpreted as an optional embodiment which may be implemented in addition to, in conjunction with, or place of the embodiments described with regard to a corresponding like-named component in any other figure.

In general, embodiments of the disclosed technology relate to implementing custom user interface (UI) actions in a web application. More specifically, embodiments of the disclosed technology enable a web application designer to implement a custom UI action on a particular webpage within the web application. In one or more embodiments of the disclosed technology, the custom UI action may be implemented in a hidden component on the webpage. The hidden component may: manage the lifecycle of the custom UI action, provide an execution environment for the custom UI action, and provide an interface to enable the custom UI action to interact with other components (visible components, hidden components) on the webpage or data services associated with the webpage and/or associated with the web application.

Figure 1:
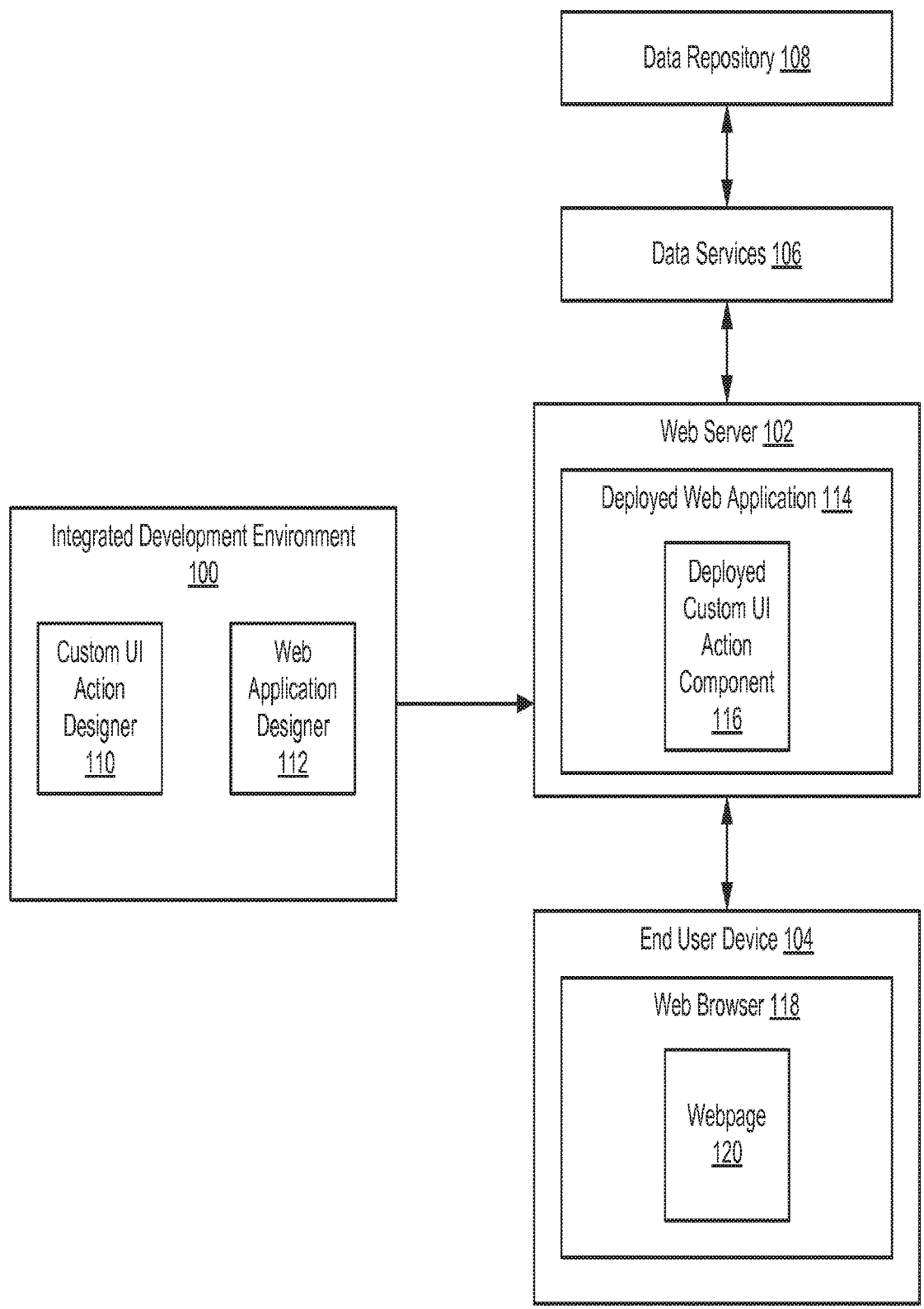
FIG. 1 shows an example system in accordance with one or more embodiments of the disclosed technology.

FIG. 1 shows an example system in accordance with one or more embodiments of the disclosed technology. The system includes an integrated development environment (IDE) (100), a web server (102), a data service(s) (106), and a data repository (108). Each of these components is described below.

Figure 9:
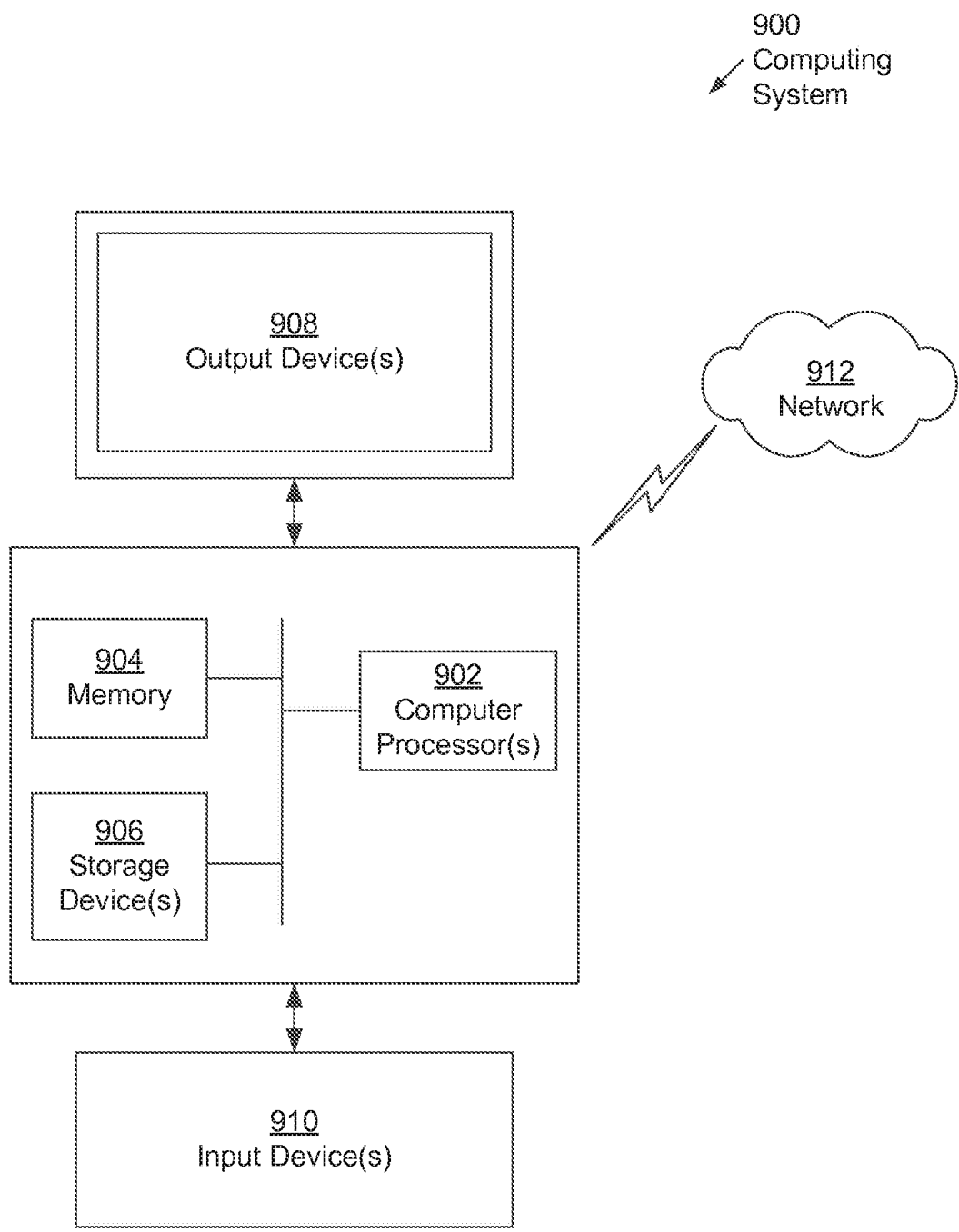
FIG. 9 shows a computing system in accordance with one or more embodiments of the disclosed technology.

In one embodiment of the disclosed technology, the IDE (100) is implemented on a computing system such as the one shown in FIG. 9 and described below. The IDE (100) is a set of software development tools that include functionality to enable a user to a build a custom UI action component to implement a custom UI action and/or that allow a web application designer to build a web application. Further, the IDE (100) may include a user interface that facilitates the development of custom UI action components and the development of web applications.

In one embodiment of the disclosed technology, a web application refers to an application that is implemented by a web server. The web application includes a series of webpages and logic that is used to: (i) perform various actions on the webpages (e.g., pre-defined UI actions and custom UI actions) and (ii) transition between webpages. The user interacts with the web application via a web browser on their end user device. The logic associated with the web application (typically in the form of executable code) may be performed by the web server, the client device, or any combination thereof. Further, the logic associated with the web application may also enable the web server to communicate with other web servers, data services, etc.

In one embodiment of the disclosed technology, the IDE includes a custom UI action designer (110). The custom UI action designer (110) is a set of software development tools that provide a user (e.g., a developer) with functionality to create a custom UI action component to implement a custom UI action. The web application may include pre-defined UI actions and custom UI actions, where the pre-defined UI actions are actions that are provided with the IDE (i.e., UI actions that are preloaded into the IDE), while custom UI actions are not provided by the IDE. Examples of pre-defined UI actions may include, but are not limited to, print, send email, add to favorites, preview, save as draft, refresh, and load data from specified source. Additional details about the custom UI actions are provided below.

Continuing with the discussion of FIG. 1, the custom UI action designer (110) may include functionality to enable the user to create (or obtain) a custom UI action definition (see FIG. 2), create (or obtain) custom UI action source code (see FIG. 2), and generate a custom UI action component that includes at least the two aforementioned inputs. The custom UI action component may also include any third-party libraries that are referenced in the custom UI action definition and/or used in the custom UI action source. Additional details related to the creation of a custom UI application component are shown in FIG. 3.

Figure 4:
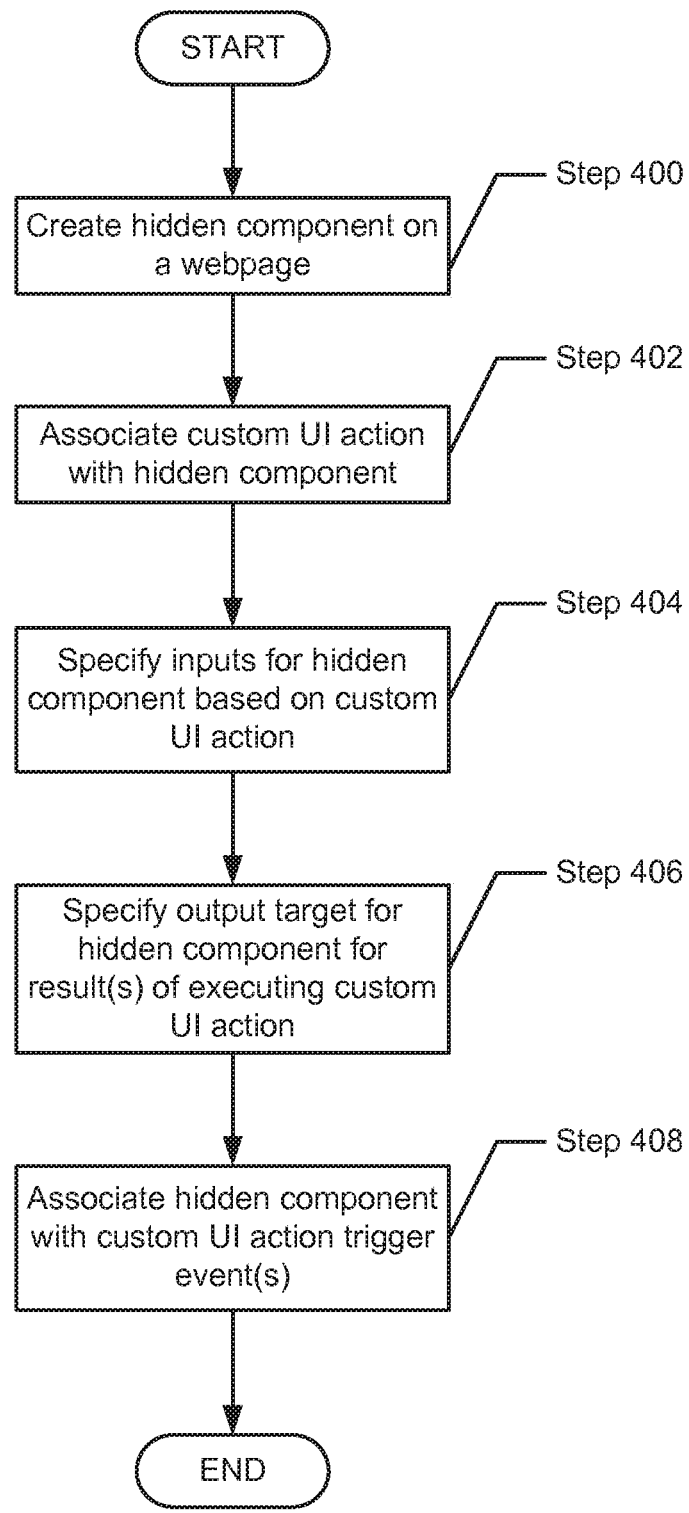
FIG. 4 shows an example method for building a web application that includes a custom UI action in accordance with one or more embodiments of the disclosed technology.

In one embodiment of the disclosed technology, the IDE includes a web application designer (112). The web application designer (112) is a set of software development tools that provide a user (e.g., a developer) with functionality to create web applications. More specifically, the web application designer (112) may include functionality to import the custom UI action component. Once imported, the user may then implement the custom UI action in a webpage(s) of the web application using the custom UI action component. The web application designer (112) may also include functionality to generate a deployed web application (114) that includes a deployed custom UI action component (116). Additional details related to the implementation of a custom UI action in a web application are shown in FIG. 4 and described below.

Those skilled in the art will appreciate the custom UI action designer (110) and the web application designer (112) may be implemented in separate IDEs on separate computing systems without departing from the disclosed technology.

In one embodiment of the disclosed technology, a web server (102) is a computing system (e.g., a computing system described in FIG. 9) that includes functionality to host a deployed web application. Hosting the deployed web application (114) may include storing the necessary files for the deployed web application including source code, images, third-party libraries, etc. and then executing the deployed web application. Executing the deployed web application may include receiving HTTP requests from an end user device (104), processing the HTTP request, generating an HTTP response based on the processing of the HTTP request, and providing the HTTP response to the end user device.

In one embodiment of the disclosed technology, the web server (102) may communicate (e.g., send and receive HTTP requests) with one or more end user devices (e.g., the computing systems in FIG. 9) over any wired network, wireless network, or any combination thereof. In one embodiment of the disclosed technology, the end user devices each include at least one web browser (118) that permits the end user device to display webpages (120) (provided with HTTP responses) to the end users.

Figure 5:
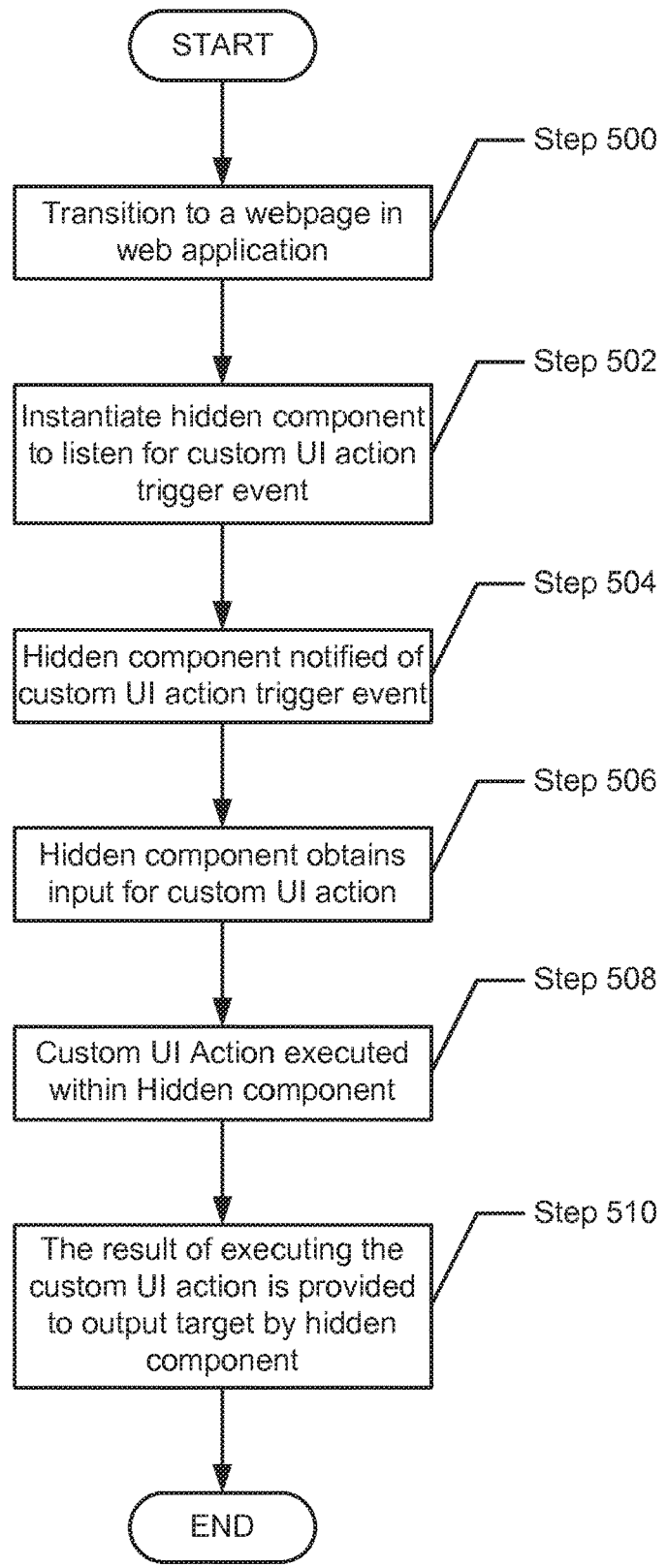
FIG. 5 shows an example method for performing a custom UI action in a deployed web application in accordance with one or more embodiments of the disclosed technology.

In one embodiment of the disclosed technology, the web server (102) may also interface (directly or indirectly) with one or more data services (106). A data service may be implemented on a computing system (e.g., the computing system in FIG. 9). Further, a data service is an interface to one or more sources of data that are being used by the web application. The data service may receive requests from the web application for certain data. In response, the data service may obtain the requested data from a data repository (108) and provide the obtained data to the web application (114). Additional details related to executing of the web application and, more specifically, execution of custom UI actions in the web application are shown in FIG. 5.

The disclosed technology is not limited to the system configuration shown in FIG. 1. Further, while FIG. 1 shows single instances of various system components, those skilled in the art will appreciate that the system may be multiple instances of one or more system components without departing from the disclosed technology.

Figure 2:
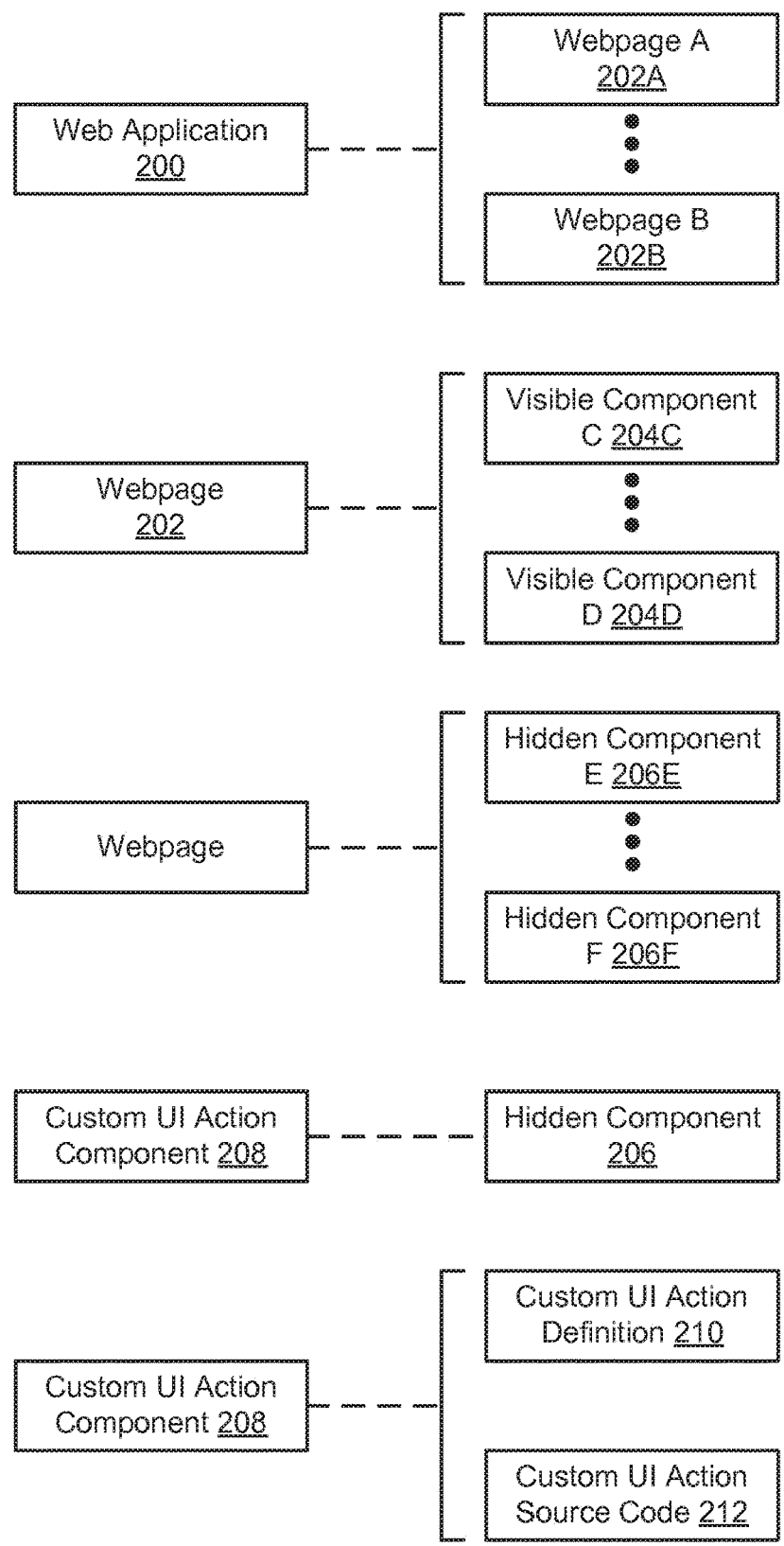
FIG. 2 shows the relationship between various components in the example system in accordance with one or more embodiment of the disclosed technology.
Figure 3:
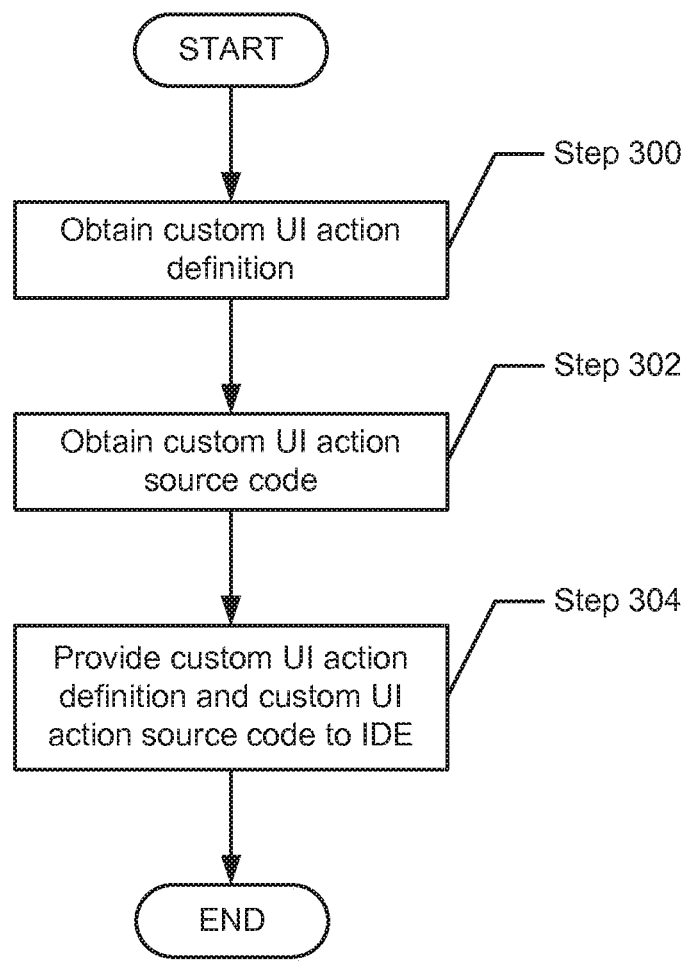
FIG. 3 shows an example method for creating a custom user interface (UI) action in accordance with one or more embodiments of the disclosed technology.

FIG. 2 shows the relationship between various components in the system in accordance with one or more embodiment of the disclosed technology.

In one embodiment of the disclosed technology, each web application (200) includes one or more webpages (202A, 202B). Further, each webpage (202) includes one or more visible components (204C, 204D). Examples of visible components include, but are not limited to, buttons, menus, context menus, dropdown menus, radio buttons, input fields, and text boxes. In one embodiment of the disclosed technology, a visible component is a component on a webpage that may: (i) trigger an action (e.g., a pre-defined UI action and/or a custom UI action); (ii) obtain input from a user for an action; and (iii) display output to a user (via the webpage).

Each webpage may also include one or more hidden components (also referred to as hidden containers) (206E, 206F), which are not visible on the webpage but are present on the webpage. Each hidden component may: manage the lifecycle of a custom UI action component (including listening for events, publishing events (including lifecycle events) generated by the custom UI action component, provide an execution environment for the custom UI action component, and provide an interface to enable the custom UI action component to interact with other components (visible components, hidden components) on the webpage or data services associated with the webpage and/or associated with the web application.

In one embodiment of the disclosed technology, lifecycle events are events which are published at certain stages of an action's (e.g., a pre-defined UI action's or a custom UI action's) lifecycle. Examples of lifecycle events may include, but are not limited to: (i) an "initialized event"—this event is published when an instance of the action is created; (ii) a "beforeRender" event—this event is published just before the action instance is associated with a webpage; (iii) an "afterRender" event—this event is published just after the action instance is associated with the webpage; (iv) a "beforeActivate" event—this event is published just before the action instance is activated to interact with other visible components or actions on the webpage; (v) an "executionStarted" event, this event is published just before the action instance is executed; (iv) an "executionCompleted" event—this event is published just after the action instance execution is completed; and (vii) a "destroy" event—this event is published when the action instance is about to be destroyed.

As discussed above, the hidden component may also publish events (in addition to (or instead of) lifecycle events) on behalf of the custom UI action component. The following includes three non-limiting examples of such events.

Example 1: a "mailSent" event—this event is published after a Send Mail custom UI action is executed and the corresponding e-mail is sent.

Example 2: an "exportedToCSV" event—this event is published after the 'Export to CSV' custom UI action completes the export of an associated result list widget data into the CSV format.

Example 3: a "logoutInitiated" event—this event is published by custom 'Logout' UI action just before it sends the request to the server for invalidating the user's web session.

Continuing with the discussion of FIG. 2, the hidden components include functionality to initialize a custom UI action component and also include functionality to listen for various events (which may include Custom UI Action trigger events (described below)). Upon receiving a particular event, the hidden component may initiate execution of the corresponding custom UI action component (or more specifically initiate execution of the custom UI action source code (212), which may be in an executable format (e.g., a binary file). The hidden component may also include functionality to obtain inputs for the custom UI action component from one or more visible components and/or hidden components. The hidden component may also include functionality to provide the result of executing the custom UI action to an output target. The output target may include, but is not limited to, a visible component (204C, 204D) (on any web page in the web application), a hidden component (206E, 206F) (on any web page in the web application), and a data service (106 in FIG. 1). Additional details about the functionality of the hidden component are described below with respect to FIGS. 4-8.

In one embodiment of the disclosed technology, each custom UI action component (208) that is implemented in a web application is associated with a hidden component (206). In one or more embodiments of the disclosed technology, all custom UI action components on a given webpage may be associated with the same hidden component. Alternatively, each custom UI action component on a given webpage is implemented in its own hidden component. In another embodiment of the disclosed technology, if there are multiple custom UI action components implemented on a given webpage, then one or more custom UI action components may be associated with one or more hidden components, where each custom UI action component is associated with only one hidden component. In one embodiment of the disclosed technology, a hidden component is only present on a given webpage if there is at least one custom UI action component associated with the hidden component. Said another way, there are no hidden components on webpages that do not include custom UI action components.

In one embodiment of the disclosed technology, each custom UI action component includes a custom UI action definition (210) and custom UI action source code (212). In one embodiment of the disclosed technology, the custom UI action definition (210) provides a high level definition of the custom UI action. For example, the custom UI action definition may include, but is not limited to, (i) the name of the custom UI action, (ii) a listing of one or more third-party libraries, (iii) configuration information for the custom UI action component (e.g., custom UI action identifier (ID), (iv) events that are generated by the custom UI action component (see e.g., the three examples of published events described above), (v) inputs for the custom UI action component (i.e., inputs that are used when performing the custom UI action); (vi) output targets for the custom UI action (i.e., one or more visible components, one or more hidden components, and/or one or more data services); and (vii) a URL for the custom UI action source code. In one embodiment of the disclosed technology, the custom UI action may specify zero or more inputs and zero or more outputs. The custom UI action definition (210) may be specified in an eXtensible mark-up language format. Other formats may be used for custom UI action definition (210) without departing from the disclosed technology. An example custom UI action definition is described below with respect to FIGS. 6A-6C.

In one embodiment of the disclosed technology, the custom UI action source code (212) is the source code that is used to implement the custom UI action. Said another way, in order to perform the custom UI action, the custom UI action source code (or an executable version thereof, e.g., a binary file resulting form the compilation of the custom UI action source code) is executed. The custom UI action source code may be, for example, written in Java Script. Other programming languages may be used for the custom UI action source code without departing from the disclosed technology.

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 3 shows a method for creating a custom UI action in accordance with one or more embodiments of the disclosed technology.

In Step 300, the custom UI action definition is obtained. In one embodiment of the custom UI action definition may be obtained by creating, e.g., using the custom UI action designer (FIG. 1, 110), the custom UI action definition to include the various components as discussed above (see e.g., FIG. 2, 210). In another embodiment of the disclosed technology, the custom UI action definition may be obtained from an external source.

In Step 302, the custom UI action source code is obtained. In one embodiment of the custom UI source code may be obtained by generating, e.g., using the custom UI action designer (FIG. 1, 110), the custom UI action source code to include the various components as discussed above (see e.g., FIG. 2, 210). In another embodiment of the disclosed technology, the custom UI action source code may be obtained from an external source.

In Step 304, the custom UI action component that includes the custom UI action definition and the custom UI action source code is provided to the IDE (or made available to the web application designer (FIG. 1, 112) in the IDE. In the event that the custom UI action definition references any third-party libraries such third-party libraries are also included in the custom UI action component. If the custom UI action source code, when executed, triggers the launching of another user interface, the custom UI action component may also include the various visual components that are presented in such a user interface. The custom UI action component may include any other components that are required to implement the custom UI action without departing from the disclosed technology.

In one embodiment of the disclosed technology, providing the custom UI action component to the IDE (or web application builder in an IDE) triggers the installation of the custom UI action component in the IDE. The result of the installation is that a user of the web application builder may implement the custom UI action on one or more webpages in a web application. From the perspective of the user of the web application designer (FIG. 1, 112) the custom UI action may be implemented in the same manner as other predefined UI actions.

FIG. 4 shows a method for building a web application that includes a custom UI action in accordance with one or more embodiments of the disclosed technology. More specifically, FIG. 4 shows a method for implementing a custom UI action on a webpage when building a web application. The method shown in FIG. 4 (or portions thereof) may be repeated each time a custom UI action is implemented on a webpage.

In Step 400, a hidden component is created on a webpage.

In Step 402, a custom UI action component is associated with the hidden component (i.e., the hidden component created in Step 400). If the IDE includes a graphical user interface (GUI) then associating the custom UI component with the hidden component may include selecting the custom UI action component and then dragging the custom UI action component to the location in the GUI that corresponds to the hidden component. In another embodiment of the disclosed technology, the custom UI action component may be associated with the hidden component by specifying the association using any known mechanism for associating the custom UI action component with the hidden component.

In Step 404, one or more inputs for the hidden component are specified based on the custom UI action. More specifically, as discussed above, the custom UI action is defined using a custom UI action definition. This custom UI action definition is used to determine which inputs the hidden component must obtain in order to implement the custom UI action. The aforementioned inputs may be determined by parsing the custom UI action definition.

In Step 406, the output target(s) for the hidden component is specified based on the custom UI action. More specifically, as discussed above, the custom UI action is defined using a custom UI action definition. This custom UI action definition is used to determine to which output target the hidden component must provide the result(s) of the execution of the custom UI action. In another embodiment of the disclosed technology, Step 406 is not performed. Specifically, the hidden component is not aware of the output target; instead, the hidden component is configured to publish an event (on a software event bus) that includes the result(s) of execution the custom UI action. The event may then be consumed by one or more output targets that are listening for a specific event(s) on the software event bus. Additional details about the software event bus are provided below.

In Step 408, the hidden component is associated with a custom UI action trigger event(s). More specifically, as discussed above, the custom UI action is defined using a custom UI action definition. This custom UI action definition is used to determine which event(s) trigger execution of the custom UI action. In one embodiment of the disclosed technology, associating the hidden component with a custom UI action trigger event comprises configuring the hidden component to listen for the custom UI action trigger event(s) on the software event bus. Examples of custom UI action trigger events include, but are not limited to, selection of a context menu, a button click, or any other UI event (i.e., an event that is published on the software event bus).

In one embodiment of the disclosed technology, once the web application has been completed, the web application (which includes webpages that implement one or more custom UI actions) is deployed to a web server (FIG. 1, 102). Deploying the web application may include creating a Web application ARchive (WAR) file that includes the collection of web pages, source code, custom UI action components, images, etc. that together constitute the web application. Other formats for deploying the web application to a web server may be used without departing from the disclosed technology. Once the web application is deployed on the web server, the web application may be referred to as a deployed web application (FIG. 1, 114) and the custom UI action component may be referred to as a deployed custom UI action component (FIG. 1, 116).

FIG. 5 shows a method for performing a custom UI action in a deployed web application in accordance with one or more embodiments of the disclosed technology. More specifically, FIG. 5 shows a method for performing a custom UI action on a webpage within a web application in accordance with one or more embodiments of the disclosed technology.

In Step 500, the web application transitions to a new webpage. Said another way, a webpage for the web application is rendered in a web browser (FIG. 1, 118). The transition may be triggered by a user of the web application (e.g., click a button, selecting a menu item, etc.) or may be triggered by the execution of the action (e.g., a custom UI action or a pre-defined UI action) (which may be directly or indirectly triggered by a user of the web application).

In Step 502, the hidden component on the webpage is initialized to listen for the custom UI action trigger event(s) for each custom UI action associated with the hidden component. Once initialized, the hidden components listens to the software event bus for custom UI action trigger events.

In one embodiment of the disclosed technology, a software event bus is a mechanism by which various visible components, hidden components, and data services (hereafter referred to as entities) may communicate. The software event bus allows each entity to listen and/or publish events to the software event bus. Publishing an event to the software event bus may result in the receipt of the event by all other entities that are listening on the software event bus. The event may include metadata (e.g., name of the event, source of the event, etc.) and, optionally, a payload (e.g., the result of executing an action, e.g., a custom UI action or a pre-defined action).

Continuing with the discussion of FIG. 5, in Step 504, the hidden component is notified of a custom UI action trigger event. For example, the hidden component may receive an event on the software event bus that is published by another entity (described above) and then determine that the received event is the custom UI action trigger event. If the custom UI action is triggered by multiple the custom UI action trigger events, then step 504 may be performed multiple times until all required custom UI action trigger events are received.

In Step 506, once the custom UI action trigger event(s) are received, the hidden component obtains the input(s) to the custom UI action (which was previously configured in Step 404). In one embodiment of the disclosed technology, the custom UI action may require additional input from a user prior to completing execution of the custom UI action. In such cases, the custom UI action may launch a separate UI, and prompt the user to enter the additional inputs for the custom UI action.

In Step 508, the custom UI action is executed within the hidden container. More specifically, the custom UI action source code (or an executable version thereof, e.g., a binary file) is executed using the inputs obtained in Step 506 in order to generate a result (i.e., one or more pieces of data, in any form/format).

In Step 510, the result is provided to the output target by the hidden component. The hidden component may directly provide the result to the output target. Alternatively, the hidden component may indirectly provide the result to the output target by publishing an event on the software event bus, where the event includes the result. The output target, which has been previously configured to listen for this event, will receive the aforementioned event and then subsequently process the result that is included within the event.

The aforementioned process may be repeated multiple times on a given webpage in the web application and/or may be repeated multiple times within a web application.

FIGS. 6A-8 show examples in accordance with one or more embodiments of the disclosed technology. The examples are not intended to limit the scope of the disclosed technology.

Figure 6A:
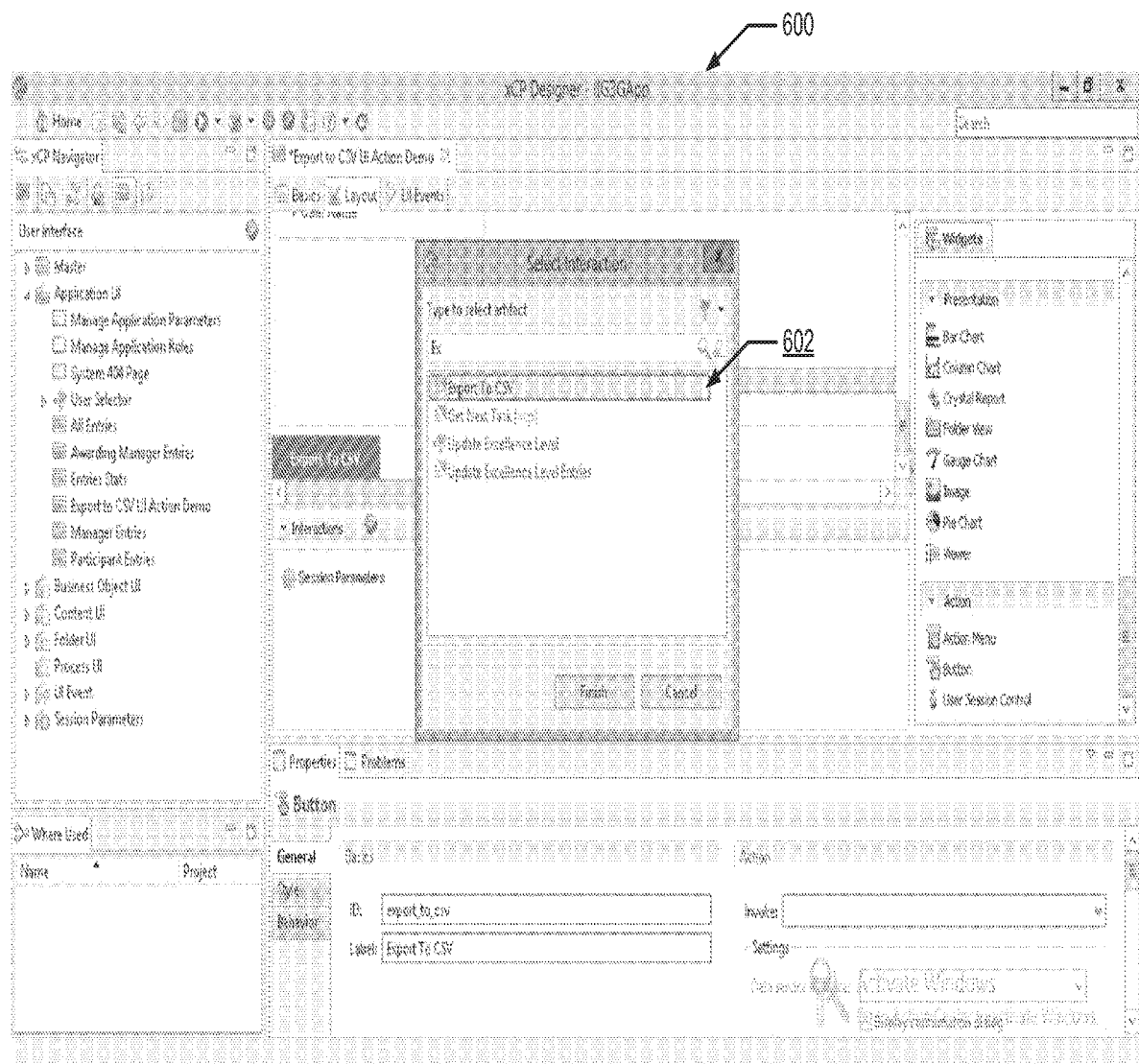
FIGS. 6A-8 show examples in accordance with one or more embodiments of the disclosed technology.
Figure 6B:
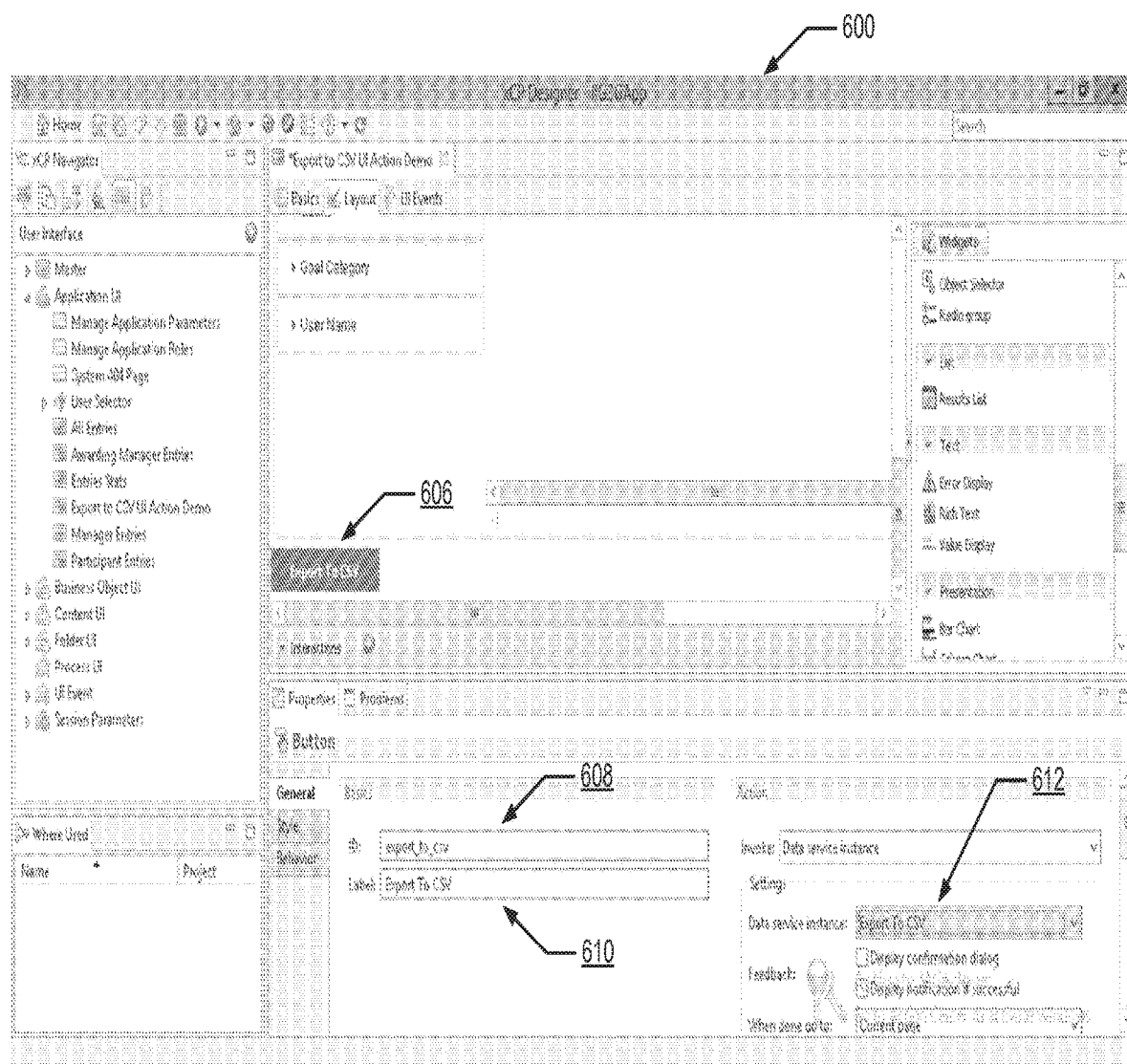
Figure 6C:
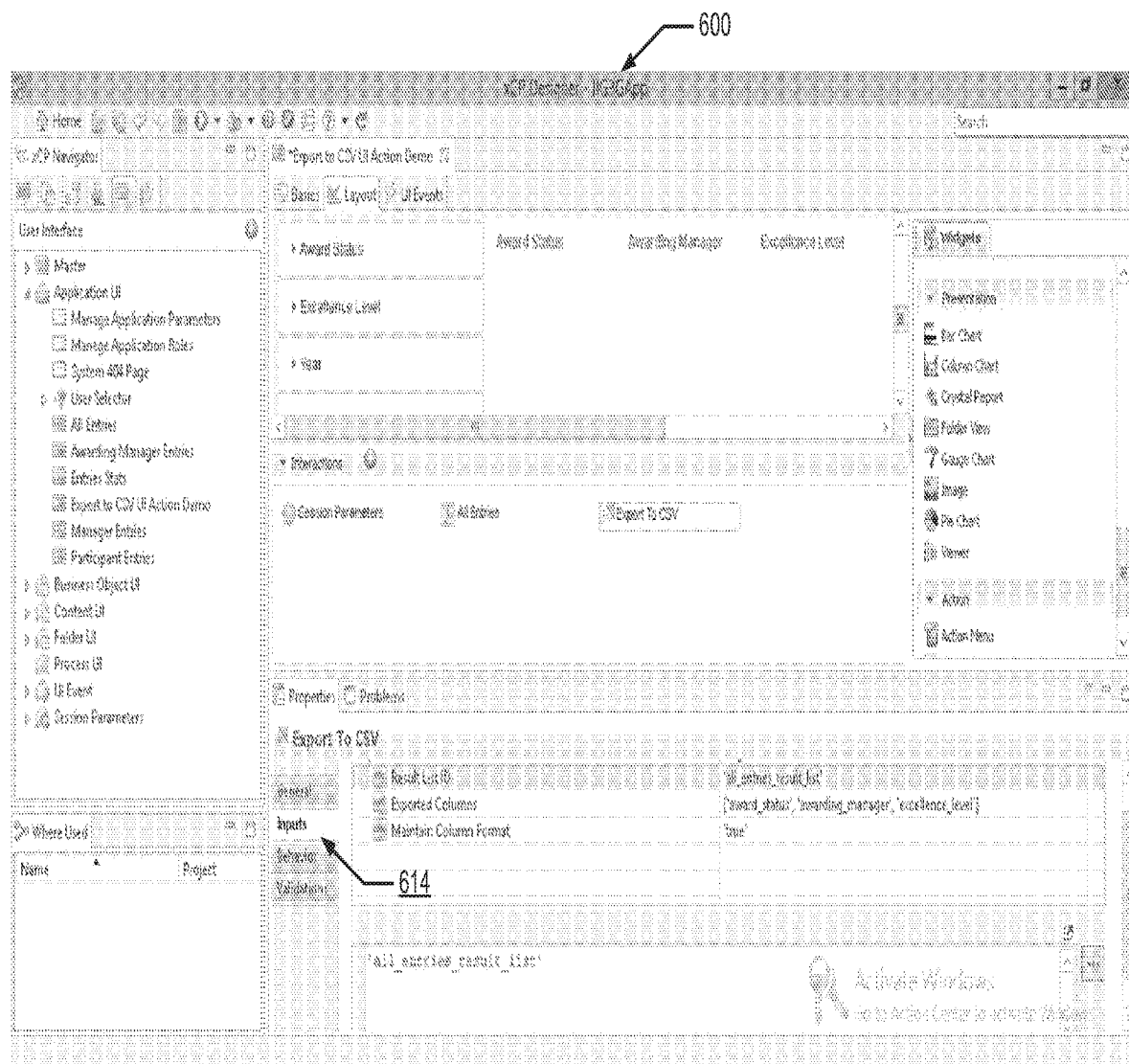

Turning to FIGS. 6A-6C, consider a scenario in which a custom UI action component includes the following custom UI action definition.

```
<action xmlns="http://documentum.emc.com/2010/UI-Model"
    xmlns:pe="http://documentum.emc.com/2010/Editors"
    id="export_to_csv"
version="1.0.0000.001">
  <name>ExportToCSV</name>
  <description>Export Result List data to the csv FILE</description>
  <content src="content/xcp/action/ExportToCSVAction.js"
nls="xcp/action/ExportToCSVAction-strings.js" type="text/javascript"/>
  <label>Export To CSV</label>
  <!-- List of input properties -->
  <configuration>
    <propertyInfo name="result_list_id" >
      <type>STRING</type>
    </propertyInfo>
    <propertyInfo name="maintain_column_format" >
      <type>STRING</type>
    </propertyInfo>
    <propertyInfo name="columns" array="true">
      <type>STRING</type>
    </propertyInfo>
  </configuration>
  <!-- List of output properties -->
  <expressionProperties>
    <propertyInfo name="exported_file_path">
      <getterFun>
        <name>getExportedFilePath</name>
      </getterFun>
      <changeEvents>
        <eventInfo>exportedToCSV</eventInfo>
      </changeEvents>
    </propertyInfo>
  </expressionProperties>
  <!-- List of published events -->
  <events>
    <eventInfo name="success"/>
    <eventInfo name="error"/>
    <eventInfo name="exportedToCSV"/>
  </events>
</action>
```

The aforementioned custom UI action definition includes the following information about the custom UI action component: (i) custom UI action ID—"export_to_csv"; (ii) URL for custom UI action source code—"content/xcp/action/ExportToCSVAction.js"; (iii) label for visible component—"Export To CSV"; (iii) inputs—"result_list_id", "columns", and "maintain column format" (iv) outputs—"exported file path"; and (v) custom UI action events—"success", "error", and "exportedToCSV."

Once the custom UI action component with the aforementioned custom UI action definition has been created, the custom UI action component may be selected, via IDE, during the design of the web application. Specifically, as shown in FIG. 6A, the user may select the "Export to CSV" action (602) via the IDE (600). Referring to FIG. 6B, once the custom UI action is selected it is associated with a visible component such as a button. In this example, the button (606) has ID "export_to_csv" (608) and a label of "Export To CSV" (610). The ID and label correspond to the custom UI action ID and the label, respectively, as defined in the custom UI action definition. Further, selected action (i.e., "Export to CSV") is displayed as the action (612) that is associated with the button (606). Referring to FIG. 6C, once the action (612) is associated with the button (606 in FIG. 6B), the user may review and/or modify the inputs (614) to the custom UI action via the IDE (600).

Figure 7:
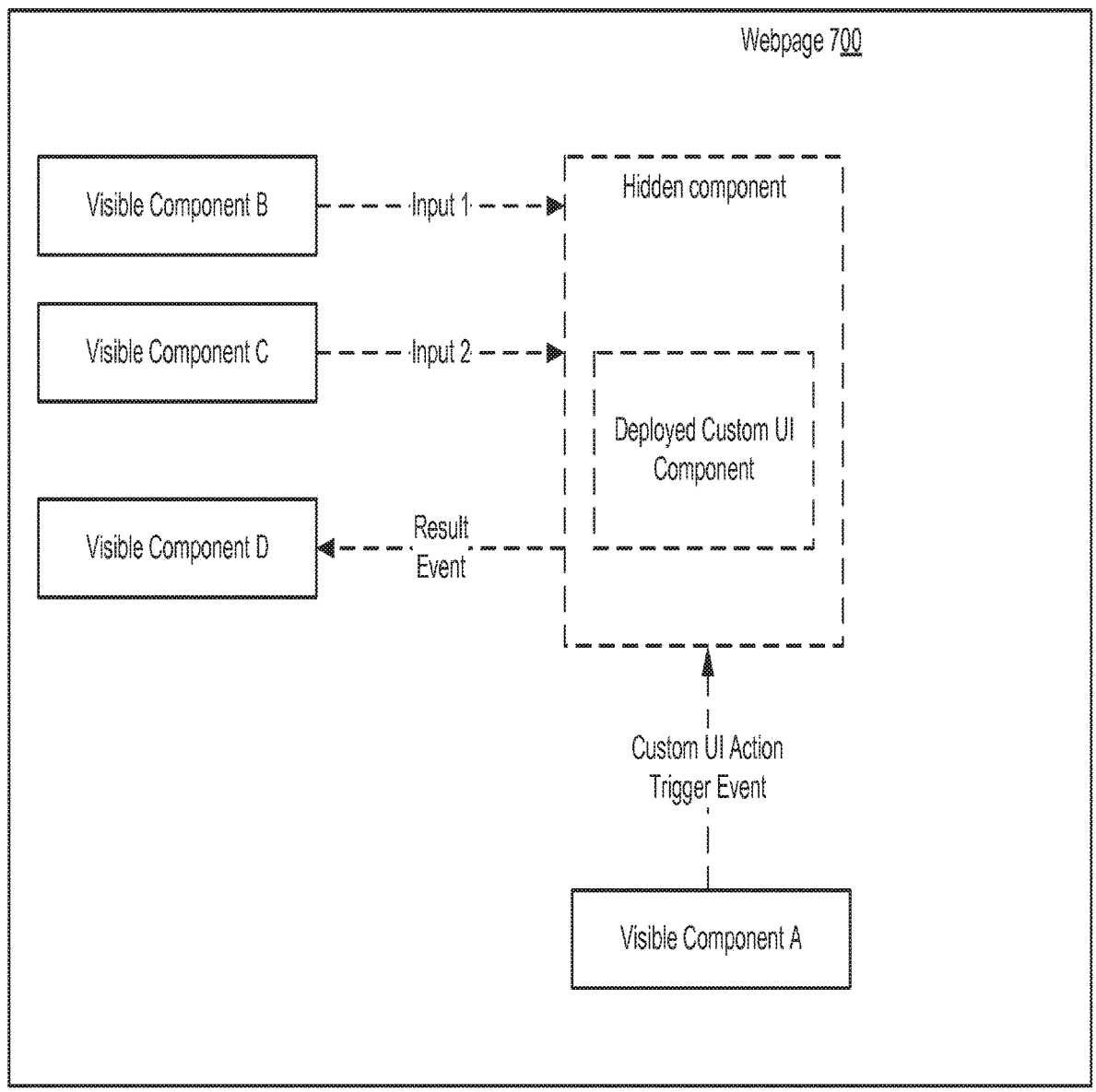

Referring to FIG. 7, FIG. 7 shows an exemplary webpage that includes a hidden component created in accordance with FIG. 4. More specifically, FIG. 7 shows a webpage (700) that includes four visible components (visible component A, visible component B, visible component C, visible component D). Further, the webpage (700) includes a hidden component that includes a deployed custom UI action component. The hidden component is configured to listen, on a software event bus (not shown), for the custom UI action trigger event. Further, the hidden component is configured to publish a result event, which includes as its payload the result generated from executing the custom UI action.

The following section provides an example of how the method described in FIG. 5 may be implemented on the webpage shown in FIG. 7. Turning to the example, consider a scenario in which visible component A is a button that, when clicked by a user, publishes an event (i.e., the custom UI action trigger event) to the software event bus. The hidden component, which is listening to the software event bus, receives notification of the custom UI action trigger event. The hidden component subsequently initiates execution of the custom UI action. Specifically, the hidden component obtains inputs (input 1, input 2) for the custom UI action from visible component B (e.g., a cell in a table that is displayed on the webpage) and visible component C (e.g., text in an input field on the webpage). The custom UI action source code (which may be in a binary form) is executed using inputs 1 and 2 in order to obtain a result (e.g., a value(s)). The hidden component subsequently generates a result event that includes the result as a payload. The result event is subsequently published on the software event bus. Visible component D, which has been previously configured to listen for the result event, receives notification of the result event on the software event bus. Visible component D subsequently extracts the result from the result event and processes (e.g., displays on the webpage) the extracted result.

Figure 8:
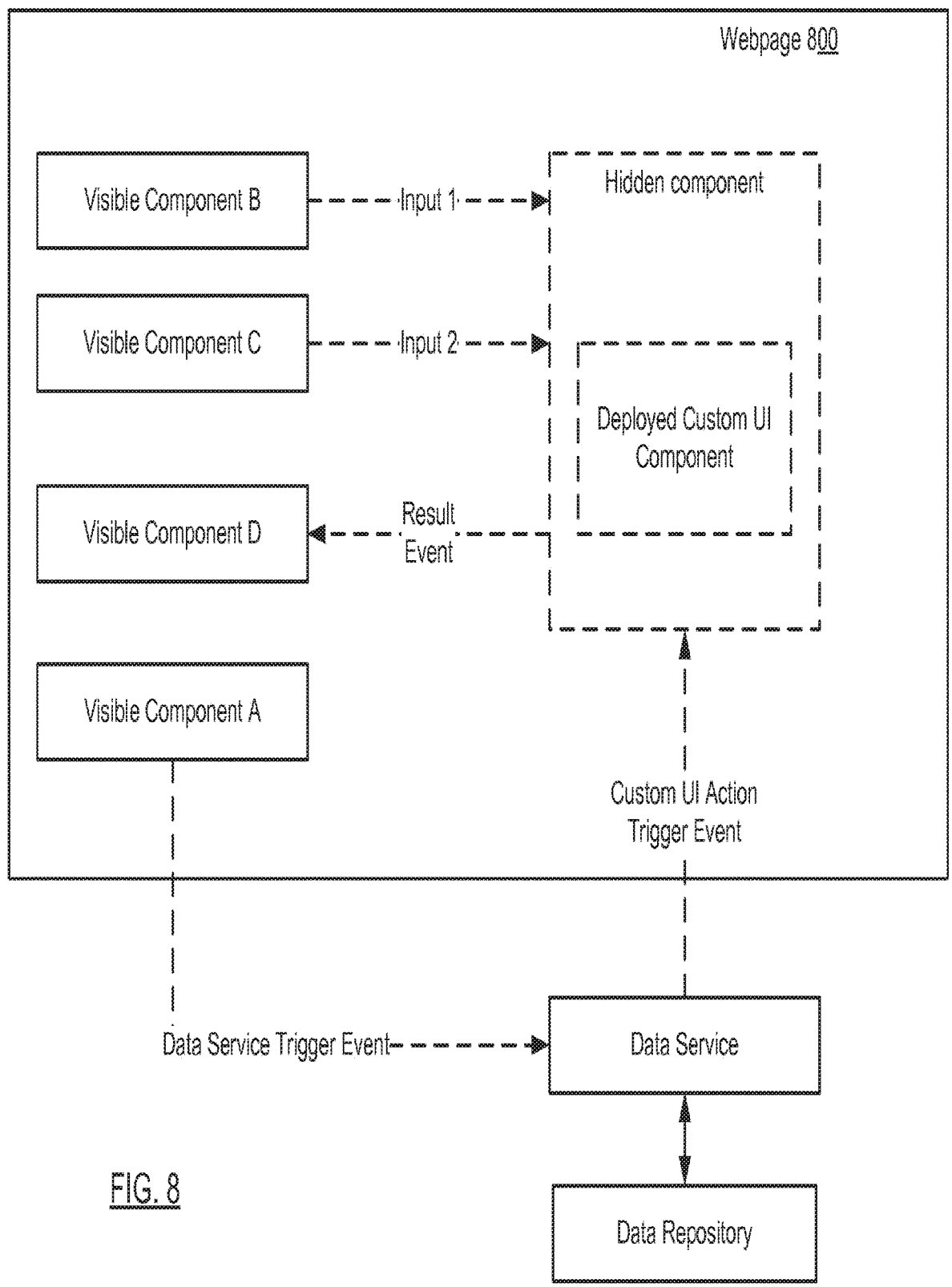

Referring to FIG. 8, FIG. 8 shows an exemplary webpage that includes a hidden component created in accordance with FIG. 4. More specifically, FIG. 8 shows a webpage (800) that includes four visible components (visible component A, visible component B, visible component C, visible component D). Further, the webpage (800) includes a hidden component that includes a deployed custom UI action component. The hidden component is configured to listen, on a software event bus (not shown), for the custom UI action trigger event. Further, the hidden component is configured to publish a result event, which includes as its payload the result generated from executing the custom UI action.

The following section provides an example of how the method described in FIG. 5 may be implemented on the webpage shown in FIG. 8. Turning to the example, consider a scenario in which visible component A is a button that, when clicked by a user, publishes an event (i.e., the data service trigger event) to the software event bus. The data service, which is listening to the software event bus, receives notification of the data service trigger event. The data service subsequently performs one or more actions in response to receiving the data service trigger event. For example, the data service may obtain data from the data repository.

Once the data service has performed the aforementioned action(s), the data service may publish an event to the event bus that includes in its payload, for example, the data received from the data repository.

In this example, assume that the event published by the data service corresponds to the custom UI action trigger event (i.e., it is the event for which hidden component is listening). The hidden component, which is listening to the software event bus, receives notification of the custom UI action trigger event. The hidden component subsequently initiates execution of the custom UI action. Specifically, the hidden component obtains inputs (input 1, input 2) for the custom UI action from visible component B and visible component C. The custom UI action source code (which may be in a binary form) is subsequently executed using inputs 1, 2, and input 3 (i.e., the data that was included in the payload of the custom UI action trigger event) in order to obtain a result (e.g., a value(s)). The hidden component subsequently generates a result event that includes the result as a payload. The result event is subsequently published on the software event bus. Visible component D, which has been previously configured to listen for the result event, receives notification of the result event on the software event bus. Visible component D subsequently extracts the result from the result event and processes the extracted result.

Embodiments of the disclosed technology may be implemented on a computing system. Any combination of mobile, desktop, server, embedded, or other types of hardware may be used. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disc (CD) drive or digital versatile disc (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the disclosed technology.

Further, one or more elements of the aforementioned computing system (900) may be located at a remote location and connected to the other elements over a network (912). Further, embodiments of the disclosed technology may be implemented on a distributed system having a plurality of nodes, where each portion of the disclosed technology may be located on a different node within the distributed system. In one embodiment of the disclosed technology, the node corresponds to a distinct computing device. Alternatively, the node may correspond to a computer processor with associated physical memory. The node may alternatively correspond to a computer processor or micro-core of a computer processor with shared memory and/or resources.

While the disclosed technology has been described with respect to a limited number of embodiments, those skilled in the art, having benefit of this disclosure, will appreciate that other embodiments can be devised which do not depart from the scope of the disclosed technology as disclosed herein. Accordingly, the scope of the disclosed technology should be limited only by the attached claims.

What is claimed is:

1. A computer program product comprising a non-transitory, computer-readable medium storing computer-readable instructions, the computer-readable instructions executable to:
provide an integrated development environment comprising:
a set of predefined user interface (UI) actions;
a set of custom user interface (UI) action tools to allow a user to create a custom UI action component that comprises:
a custom UI action, the custom UI action comprising source code for the custom UI action;
a custom UI action definition that references the source code for the custom UI action and specifies a first input to obtain for the custom UI action and a custom UI action trigger for the custom UI action;
a set of web application design tools to allow the user to design a first web application, said set of web application design tools comprising functionality to:
select the custom UI action component;
create a hidden component on a webpage of the first web application;
associate the custom UI action component with the hidden component of the webpage;
configure the hidden component according to the custom UI action definition based on the user associating the custom UI action component with the hidden component;
deploy the first web application as a deployed web application, the deployed web application comprising:
the set of predefined UI actions;
the webpage, the webpage including a first visible component and the hidden component, the hidden component configured according to the custom UI action definition to listen for the custom UI action, respond to the custom UI action trigger to obtain the first input from the first visible component and execute the custom UI action on the first input within the hidden component to generate a result, wherein the deployed web application is executable to provide the webpage, including the first visible component and the hidden component, to a client device in response to a request; and code executable to respond to a transition to the webpage to initialize the hidden component on the webpage to listen for the custom UI action trigger.

2. The computer program product of claim 1, wherein the hidden component provides an interface between the custom UI action and the first visible component on the webpage.

3. The computer program product of claim 2, wherein the computer-readable instructions are executable to configure the hidden component to publish an event on a software event bus, the event including the result of execution of the custom UI action.

4. The computer program product of claim 1, wherein the webpage includes a second visible component, wherein the second visible component comprises at least one selected from a group consisting of a button, a context menu, and a dropdown menu, and wherein the hidden component is configured to listen for the custom UI action trigger from the second visible component.

5. The computer program product of claim 1, wherein the custom UI action definition specifies a first output target and wherein the computer-readable instructions are executable to configure the hidden component to provide the result of execution of the custom UI action to the first output target.

6. The computer program product of claim 5, wherein the webpage comprises a second visible component and wherein the first output target is the second visible component.

7. The computer program product of claim 5, wherein the first output target is a data service associated with the deployed web application.

8. The computer program product of claim 5, wherein the set of web application design tools comprise functionality to:

based on the user associating the custom UI action component with the hidden component:
specify the first input is an input for the hidden component based on the custom UI action definition;
associate the hidden component with the custom UI action trigger based on the custom UI action definition; and
specify the first output target as an output target for the hidden component based on the custom UI action definition.

9. The computer program product of claim 1, wherein the custom UI action trigger is one selected from a group consisting of button click, a context menu item selection, and a UI event.

10. A system comprising:
a processor;
a non-transitory, computer-readable medium storing computer-readable instructions, the computer-readable instructions executable by the processor to:
provide an integrated development environment comprising:
a set of predefined user interface (UI) actions;
a set of custom user interface (UI) action tools to allow a user to create a custom UI action component that comprises:
a custom UI action, the custom UI action comprising source code for the custom UI action;
a custom UI action definition that references the source code for the custom UI action and specifies a first input to obtain for the custom UI action and a custom UI action trigger for the custom UI action;

a set of web application design tools to allow the user to design a first web application, said set of web application design tools comprising functionality to:
select the custom UI action component;
create a hidden component on a webpage of the first web application;
associate the custom UI action component with the hidden component of the webpage;
configure the hidden component according to the custom UI action definition based on the user associating the custom UI action component with the hidden component;
deploy the first web application as a deployed web application, the deployed web application comprising:
the set of predefined UI actions;
the webpage, the webpage including a first visible component and the hidden component, the hidden component configured according to the custom UI action definition to listen for the custom UI action trigger, respond to the custom UI action trigger to obtain the first input from the first visible component and execute the custom UI action on the first input within the hidden component to generate a result, wherein the deployed web application is executable to provide the webpage, including the first visible component and the hidden component, to a client device in response to a request; and
code executable to respond to a transition to the webpage to initialize the hidden component on the webpage to listen for the custom UI action trigger.

11. The system of claim 10, wherein the hidden component provides an interface between the custom UI action and the first visible component on the webpage.

12. The system of claim 11, wherein the computer-readable instructions are executable to configure the hidden component to publish an event on a software event bus, the event comprising the result of execution of the custom UI action.

13. The system of claim 11, wherein the webpage includes a second visible component, wherein the second visible component comprises at least one selected from a group consisting of a button, a context menu, and a dropdown menu, and wherein the hidden component is configured to listen for the custom UI action trigger from the second visible component.

14. The system of claim 10, wherein the custom UI action definition specifies a first output target and wherein the computer-readable instructions are executable to configure the hidden component to provide the result of execution of the custom UI action to the first output target.

15. The system of claim 14, wherein the webpage comprises a second visible component and wherein the first output target is the second visible component.

16. The system of claim 14, wherein the first output target is a data service associated with the deployed web application.

17. The system of claim 14, wherein the set of web application design tools comprise functionality to:
based on the user associating the custom UI action component with the hidden component:
specify the first input is an input for the hidden component based on the custom UI action definition;
associate the hidden component with the custom UI action trigger based on the custom UI action definition; and specify the first output target as an output target for the hidden component based on the custom UI action definition.

18. The system of claim 10, wherein the custom UI action trigger is one selected from a group consisting of button click, a context menu item selection, and a UI event.

* * * * *